United States Patent
Kim et al.

(10) Patent No.: US 12,380,664 B2
(45) Date of Patent: Aug. 5, 2025

(54) ELECTRONIC DEVICE FOR GENERATING IMAGE AND METHOD THEREOF

(71) Applicant: SAMSUNG ELECTRONICS CO., LTD., Suwon-si (KR)

(72) Inventors: Sungoh Kim, Suwon-si (KR); Jaemin Joo, Suwon-si (KR); Woojhon Choi, Suwon-si (KR); Kihuk Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 239 days.

(21) Appl. No.: 17/985,610

(22) Filed: Nov. 11, 2022

(65) Prior Publication Data
US 2023/0154131 A1    May 18, 2023

Related U.S. Application Data

(63) Continuation of application No. PCT/KR2022/017679, filed on Nov. 11, 2022.

(30) Foreign Application Priority Data

Nov. 12, 2021  (KR) .................. 10-2021-0156092
Dec. 9, 2021   (KR) .................. 10-2021-0175611

(51) Int. Cl.
*G06V 10/141* (2022.01)
*G06T 7/00* (2017.01)

(52) U.S. Cl.
CPC .......... *G06V 10/141* (2022.01); *G06T 7/0002* (2013.01); *G06T 2207/10024* (2013.01); *G06T 2207/10144* (2013.01)

(58) Field of Classification Search
CPC ...... H04N 23/71; H04N 23/73; G06V 10/141; G06T 7/0002; G06T 2207/10024; G06T 2207/10144
See application file for complete search history.

(56) References Cited

U.S. PATENT DOCUMENTS 6,665,010 B1 * 12/2003 Morris ............... H04N 25/77
                                              348/E3.018
2002/0012463 A1   1/2002 Yamada
(Continued)

FOREIGN PATENT DOCUMENTS

CN    111078170 A    4/2020
JP    2001359114 A   12/2001
(Continued)

OTHER PUBLICATIONS

International Search Report and Written Opinion for International Application No. PCT/KR2022/017679; International Filing Date Nov. 11, 2022; Date of Mailing Feb. 20, 2023; 9 Pages.

*Primary Examiner* — Nicholas G Giles
(74) *Attorney, Agent, or Firm* — CANTOR COLBURN LLP

(57) ABSTRACT

According to various embodiments, an electronic device may include a display, a first camera module disposed under the display and including a first image sensor, the first image sensor comprising a first row and a second row adjacent to the first row and a processor. The processor is configured to obtain first image data using the first row according to a first exposure condition set based on a pixel input value of a first color disposed in the first row, to obtain second image data using the second row according to a second exposure condition set based on an pixel input value of a second color disposed in the second row and to generate a first image based on the first image data and the second image data.

12 Claims, 11 Drawing Sheets

(56) References Cited

U.S. PATENT DOCUMENTS

| | | |
|---|---|---|
| 2008/0225135 A1 | 9/2008 | Mizukura et al. |
| 2009/0091554 A1 | 4/2009 | Keam |
| 2011/0169980 A1 | 7/2011 | Cho et al. |
| 2012/0044394 A1 | 2/2012 | Komiya et al. |
| 2013/0242152 A1* | 9/2013 | Kasai .................. H04N 25/447 348/294 |
| 2017/0078550 A1 | 3/2017 | Terasawa |
| 2017/0142313 A1 | 5/2017 | Gren et al. |
| 2017/0187949 A1 | 6/2017 | Kim et al. |
| 2018/0041724 A1 | 2/2018 | Kim et al. |
| 2019/0035064 A1 | 1/2019 | Franklin |
| 2021/0168282 A1 | 6/2021 | Geng et al. |

FOREIGN PATENT DOCUMENTS

| | | |
|---|---|---|
| JP | 2012044519 A | 3/2012 |
| JP | 2016220037 A | 12/2016 |
| JP | 2018146773 A | 9/2018 |
| JP | 2018148393 A | 9/2018 |
| KR | 20070098960 A | 10/2007 |
| KR | 20100051362 A | 5/2010 |
| KR | 20110082421 A | 7/2011 |
| KR | 20160030352 A | 3/2016 |
| KR | 20170076267 A | 7/2017 |
| KR | 20180050803 A | 5/2018 |
| KR | 20200022041 A | 3/2020 |
| KR | 20210132497 A | 11/2021 |
| WO | 02078319 A2 | 10/2002 |

* cited by examiner

ELECTRONIC DEVICE FOR GENERATING IMAGE AND METHOD THEREOF

CROSS REFERENCE TO RELATED APPLICATION

This application is a PCT-Bypass Continuation of International Application No. PCT/KR2022/017679 designating the United States, filed on Nov. 11, 2022, in the Korean Intellectual Property Receiving Office and claiming priority to Korean Patent Application No. 10-2021-0175611, filed on Dec. 9, 2021, and Korean Patent Application No. 10-2021-0156092, filed on Nov. 12, 2021, the disclosures of all of which are incorporated by reference herein in their entireties.

BACKGROUND

Technical Field

Various embodiments relate to an electronic device and methods for generating an image.

Description of Related Art

An electronic device, such as a smartphone or a tablet personal computer (PC), may include a camera (or a camera module or a camera device) to take pictures or videos.

User demands for miniaturized electronic devices with a larger screen and a sophisticated appearance are increasing. To satisfy the demands, electronic devices with a notch, a U-shaped hole, a V-shaped hole, or an O-shaped hole formed in a portion of a housing (or a display) and a camera module exposed to the outside through the notch or hole have been proposed.

To implement a full screen, an under display camera (UDC) technology for disposing a camera under a display has been implemented in an electronic device.

SUMMARY

When an electronic device includes an under display camera (UDC), image quality may deteriorate due to the characteristics of the pattern of a display panel. For example, light may be diffracted or scattered by the pattern of the display panel, and the resulting attenuation of components of some frequency bands may result in a decrease in resolution. For example, the flare of starbuster may be lost, and a transmittance deviation may occur in each wavelength.

One of the factors determining the quality of an image sensor is dynamic range.

Dynamic range is the difference between the darkest and brightest parts representable in an image (or video), indicating a maximum range in which an input signal may be processed without distortion. When a UDC is used, a short-wavelength dynamic range is relatively small in view of a relatively low short-wavelength transmittance, which causes relative amplification of noise in a short-wavelength area after image processing.

An apparatus and method for generating an image according to various embodiments may provide a method of compensating for deterioration of a short-wavelength area by controlling an exposure condition of an image sensor on a line-by-line basis, using a staggered high dynamic range (HDR), when a UDC is used.

According to various embodiments, an electronic device may include a display, a first camera module disposed under the display and including a first image sensor, the first image sensor comprising a first row and a second row adjacent to the first row and a processor. The processor is configured to obtain first image data using the first row according to a first exposure condition set based on a pixel input value of a first color disposed in the first row, to obtain second image data using the second row according to a second exposure condition set based on an pixel input value of a second color disposed in the second row and to generate a first image based on the first image data and the second image data.

According to various embodiments, a method of operating an electronic device including a first camera module and a display and may include obtaining first image data using a first row of a first image sensor included in the first camera module according to a first exposure condition set based on a pixel input value of a first color disposed in the first row, obtaining second image data using a second row adjacent to the first row of the first image sensor according to a second exposure condition set based on an pixel input value of a second color disposed in the second row, and generating a first image based on the first image data and the second image data. The first camera module may be disposed under a display of the electronic device.

According to various embodiments, a method of operating an electronic device including a camera may include executing a camera application, determining whether the camera is an under display camera (UDC), setting a general exposure condition for the camera application in an event the camera is not a UDC and subsequently generating an image and identifying ambient environmental information and setting an exposure condition on a line-by-line basis based on the ambient environmental information and subsequently generating the image.

As an apparatus and method for generating an image according to various embodiments are provided, a method of reducing noise in an image by compensating for deterioration of a short-wavelength area with a relatively low transmittance in a UDC may be provided.

DETAILED DESCRIPTION

Figure 1:
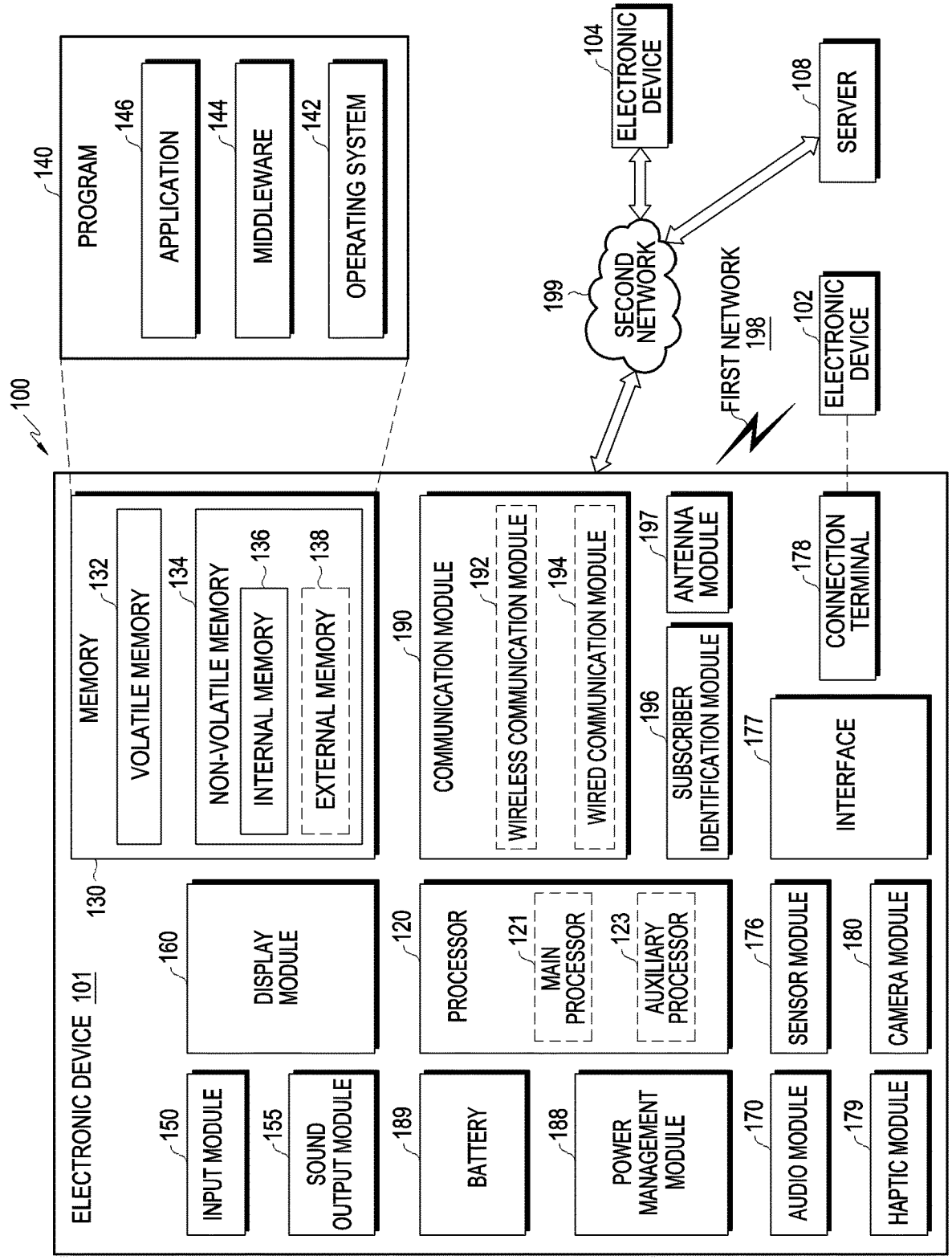
FIG. 1 is a block diagram illustrating an electronic device in a network environment according to various embodiments.

FIG. 1 is a block diagram illustrating an electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator. The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
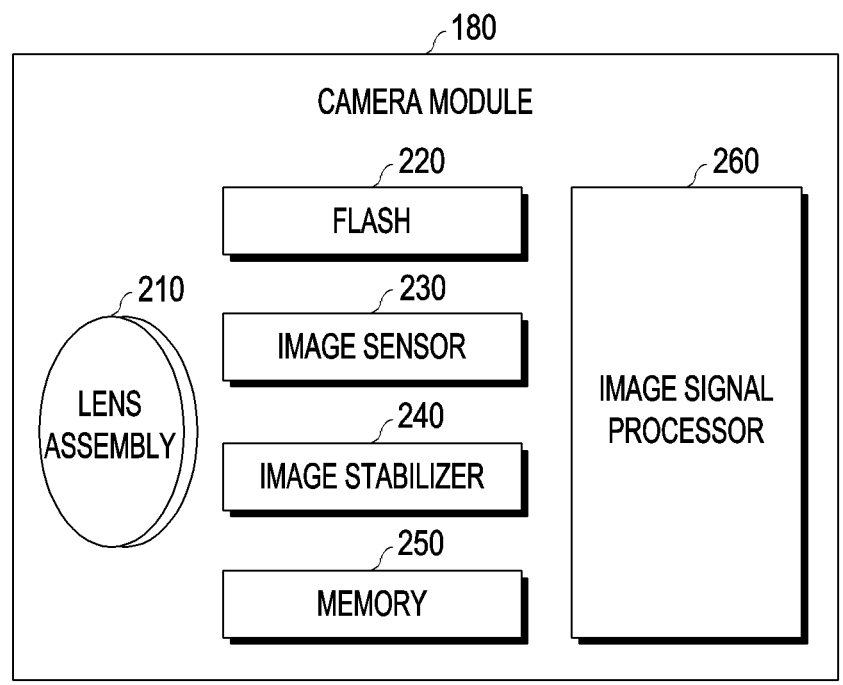
FIG. 2 is a block diagram illustrating a camera module according to various embodiments.

FIG. 2 is a block diagram illustrating a camera module according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
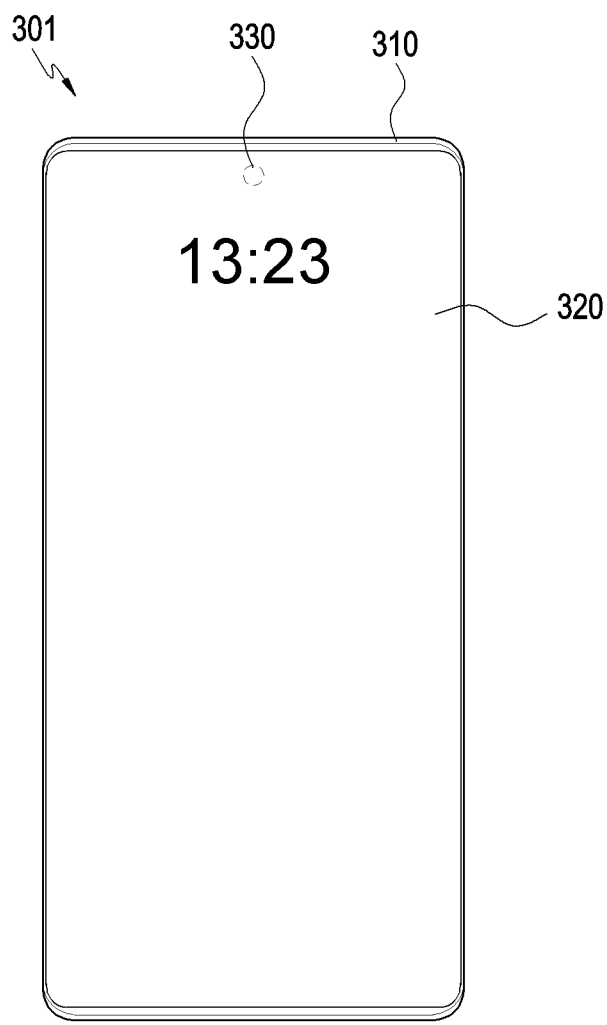
FIG. 3 is a diagram illustrating an electronic device according to various embodiments.

FIG. 3 is a diagram illustrating an electronic device according to various embodiments.

Referring to FIG. 3, an electronic device 301 (e.g., the electronic device 101 of FIG. 1) according to various embodiments may include a body 310, a display 320 (e.g., the display module 160 of FIG. 1), and a camera module 330 (e.g., the camera module 180 of FIG. 1 or FIG. 2). While one camera module is shown as included in FIG. 3 by way of example, the disclosure is not limited thereto.

According to various embodiments, the body (or housing) 310 may include various components required for the operations of the electronic device 301. For example, the body 310 may include various components therein, such as a board (e.g., a printed circuit board (PCB), a flexible PCB (FPCB), or a rigid-flexible PCB (RFPCB)), a processor (e.g., the processor 120 of FIG. 1), memory (e.g., the memory 130 of FIG. 1), or a communication module (e.g., the communication module 190 of FIG. 1).

According to various embodiments, the display 320 may be disposed on a first surface (e.g., a front surface) of the body 310, and the camera module 330 may be disposed to face the first surface. For example, the camera module 330 may not be visually exposed, and may be an under display camera (UDC).

In FIG. 3, the camera module 330 is shown as disposed to face the first surface (e.g., the front surface or a surface on which the display 320 is mainly disposed) of the body 310 by way of example, which should not be construed as limiting. For example, when the display 320 extends to a second surface (e.g., a rear surface) of the body 310, the camera module 330 may be disposed to face the second surface (e.g., the rear surface) of the main body 310.

According to various embodiments, the display 320 may display various types of content such as text or images. The display 320 may include a plurality of layers. For example, the display 320 may be a structure in which a window layer, a touch screen panel, a display panel, and/or a protective layer are sequentially stacked.

According to various embodiments, the display 320 may allow external light to pass through at least a partial area in which the camera module 330 is disposed. For example, the display 320 may allow external light to pass through an empty space between pixels included in the display 320. The camera module 330 may capture an image using the received external light that passes through the display 320.

According to various embodiments, the camera module 330 may be mounted in an area from which at least some layers included in the display 320 are removed. For example, a layer (e.g., a shielding layer) through which external light is not allowed to pass may be removed, and a lens unit (e.g., a lens unit 331 of FIG. 4) of the camera module 330 may be disposed in the layer-removed area.

According to various embodiments, a patterned metal layer (hereinafter, a pattern layer) may be disposed on a front surface of the lens unit (e.g., the lens unit 331 of FIG. 4) of the camera module 330. For example, the pattern layer (e.g., a pattern layer 410 of FIG. 4) may be one layer forming the display 320, and disposed between the pixels of a display panel and the lens unit of the camera module.

Figure 4:
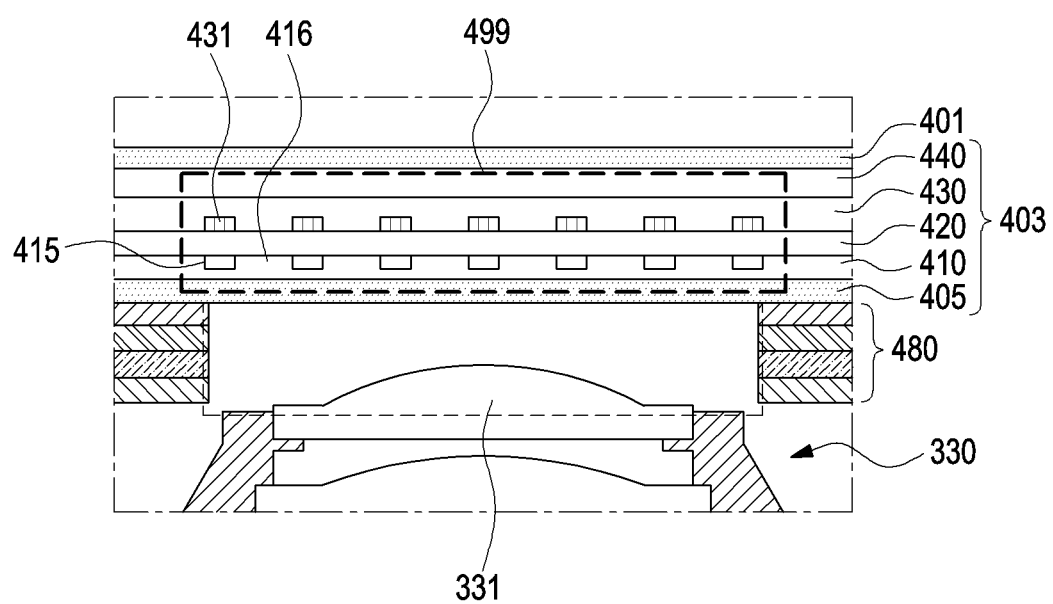
FIG. 4 is a cross-sectional view illustrating a display and a camera module according to various embodiments.

FIG. 4 is a cross-sectional view illustrating a display and a camera module according to various embodiments. The camera module of FIG. 4 may be the camera module 330 of FIG. 3. The display of FIG. 4 may be the display 320 of FIG. 3. FIG. 4 is illustrative, not limited thereto.

Referring to FIG. 4, the display (e.g., the display 320 of FIG. 3) may include a window layer 401, a display panel 403, and a protective layer (or a shielding layer or a rear cover) 480.

According to various embodiments, the window layer (e.g., ultra-thin glass (UTG)) 401 may include a polymer. In this case, the window layer 401 may include polyethylene terephthalate (PET) or polyimide (PI). In various embodiments, a plurality of window layers 401 may be disposed.

While not shown in FIG. 4, the display 320 may further include a touch panel (a touch sensor) between the window layer 401 and the display panel 403.

According to various embodiments, the display 320 may include a control circuit (not shown). For example, the control circuit (not shown) may include a display driver integrated circuit (IC) (DDI) and/or a touch display driver IC (TDDI) arranged in a chip on panel (COP) or chip on film (COF) manner.

According to various embodiments, the electronic device 301 may include a plurality of displays (e.g., first and second displays), and at least one of the plurality of displays may have flexible characteristics. For example, in the electronic device 301, the first display (e.g., the display 320) may include an on cell touch AMOLED (OCTA) display, and the second display (e.g., a flexible display) may include an unbreakable (UB) type active matrix organic light-emitting diode (OLED) display.

According to various embodiments, the display panel 403 may include a base layer 405, the pattern layer 410, a wiring layer 420, a light emitting layer (or organic material layer) 430, and an encapsulation layer (or a protective layer) 440. While not shown in FIG. 4, the display panel 403 may further include a polarizer (e.g., a polarization film), an adhesive layer, and a touch panel. For example, the adhesive layer may be disposed, as an adhesive member (e.g., optical clear adhesive (OCA) or pressure sensitive adhesive (PSA)), between every pair of layers.

According to various embodiments, the base layer 405 may be formed beneath the pattern layer 410 (e.g., in a direction toward the camera module 330). For example, the wiring layer 420 and the light emitting layer 430 may be stacked on the base layer 405 and the pattern layer 410. According to various embodiments, the base layer 405 may include a transparent insulating substrate. For example, the base layer 405 may be formed of a glass substrate, a quartz substrate, or a transparent resin substrate. For example, the transparent resin substrate may include a polyimide-based resin, an acryl-based resin, a polyacrylate-based resin, a polycarbonate-based resin, or a polyether-based resin, a sulfonic acid-based resins, and/or a polyethyleneterephthalate-based resin.

According to various embodiments, for the pattern layer (or bottom metal layer (BML)) 410, a pattern may be formed in an area where at least part of the protective layer (or the shielding layer or the rear cover) 480 is removed to dispose the camera module 330 therein. The pattern layer 410 may include a blocking portion (or blocking area) 415 and an opening (or an open area) 416. The blocking portion 415 may be an area corresponding at least partially to a pixel 431 of the light emitting layer (organic material layer) 430, and the opening 416 may be an area corresponding at least partially to a panel opening between pixels 431 of the light emitting layer (organic material layer) 430. According to an embodiment, the pattern layer 410 may be made of a metal material and formed under the wiring layer 420 by deposition and/or patterning. The pattern layer 410 may protect the pixels 431 of the light emitting layer (organic material layer) 430 and block light generated from the pixels 431. According to various embodiments, the pattern layer 410 may include a specified pattern (black matrix) to reduce diffraction of light incident on the camera module 330 or an opaque metal layer (e.g., a buffer layer) including specified patterns.

According to various embodiments, external light passing through the opening 416 may be introduced into the lens unit 331. For example, the light may be diffracted or scattered according to the shape or size of the opening 416.

According to various embodiments, the wiring layer 420 and the light emitting layer 430 may be formed by depositing a light emitting element (e.g., organic electro luminescence (EL)) on a thin film transistor (TFT) substrate. According to various embodiments, the light emitting layer 430 may include a plurality of pixels 431 where each pixel 431 includes a plurality of sub-pixels (e.g., red, green, and blue sub-pixels). According to various embodiments, the display panel 403 may include an active area (e.g., a view area) and an inactive area (e.g., a non-view area). For example, the active area may correspond to an area in which the plurality of pixels 431 are disposed, and the inactive area may be disposed outside the active area and correspond to a bezel area of the display panel 403.

According to various embodiments, the wiring layer 420 may include a TFT device to drive operations of each pixel 431 of the active area, a metal wiring, or an insulating layer. According to various embodiments, the wiring layer 420 may include a liquid crystal polymer (LCP), low temperature polycrystalline silicon (LTPS), or low temperature polycrystalline oxide (LTPO) glass, and the plurality of pixels 431 may include a TFT formed on the LTPS glass.

According to various embodiments, the light emitting layer 430 may include a light emitting element (e.g., organic EL). The organic EL may generate light, when holes and electrons are introduced from an anode and a cathode.

According to various embodiments, when the display panel 403 is viewed from the first surface (e.g., the front surface), a plurality of pixels 431 may not be arranged in an area overlapping at least partially with at least one component (e.g., the camera module 330 or a sensor module (e.g., the sensor module 176 of FIG. 1)) included in the electronic device 301. Alternatively, a plurality of pixels 431 may have a lower arrangement density than in a non-overlapping area may be included in an area overlapping at least partially with at least one component (e.g., the camera module 330 or a sensor module (e.g., the sensor module 176 of FIG. 1)) included in the electronic device 301.

According to various embodiments, the encapsulation layer 440 (e.g., thin film encapsulation (TFE)) may be a layer in which an organic layer and an inorganic layer alternately cover the light emitting layer 430 to protect light emitting elements from oxygen or moisture. For example, the encapsulation layer 440 may be a pixel passivation layer to protect the plurality of pixels 431. For example, the encapsulation layer 440 may include encapsulation glass.

According to various embodiments, the protective layer (or the shielding layer) 480 may support and protect the display panel 403. The protective layer 480 may block light or electromagnetic waves incident on the display panel 403 from being introduced into the electronic device 301. The protective layer 480 may include a black film and a metal (e.g., copper) plate. For example, the protective layer 480 may be disposed under or beneath the display panel 403, thereby providing a dark background for securing visibility of the display panel 403 and serving as a buffering member (e.g., cushion) for buffering. For example, the protective layer 480 may include an opaque metal layer (e.g., a black layer including an uneven pattern) to remove air bubbles that may be generated between the display panel 403 and its underlying attachments and block light generated from the display panel 403 or externally incident light, and/or a buffering layer (e.g., a sponge layer) disposed to mitigate an impact.

According to various embodiments, the protective layer 480 may include a heat dissipation member (e.g., a graphite sheet) to dissipate heat and/or a conductive member (e.g., a metal plate). For example, the conductive member may help to reinforce the rigidity of the electronic device 301, shield ambient noise, and be used to dissipate heat emitted from surrounding heat emission components.

According to various embodiments, at least part of the protective layer 480 may be opened, and the lens unit 331 may be disposed in the open area. The pattern of the pattern layer 410 may be formed in an area where the protective layer 480 is removed.

Referring to FIG. 4, according to various embodiments, light emitted from an external light source and passing through a portion (e.g., a first portion 499) of the display 320 (e.g., the display panel 403) may reach the lens unit 331 to be used for image capturing. For example, the first portion 499 of the display 320 (e.g., the display panel 403) may refer to an area of the display panel 403 corresponding to the area in which the camera module 330 (e.g., the lens unit 331) is disposed. For example, the electronic device 301 may obtain an image, using light emitted from the light source and introduced through the first portion 499 of the display panel 403.

According to various embodiments, the electronic device 301 (e.g., the processor 120 of the electronic device 101 of FIG. 1 or the image signal processor 260 of FIG. 2) may control a portion (e.g., the first portion 499) of the display 320. When it is said that the electronic device 301 controls the portion (e.g., the first portion 499) of the display 320, it may mean that the portion (e.g., the first portion 499) of the display panel 403 is controlled. For example, when it is said that the electronic device 301 controls the first portion 499 of the display 320, this may mean that at least a partial area of the wiring layer 420 and/or the light emitting layer 430 of the display panel 403, included in the first portion 499 is controlled. For example, when it is said that the electronic device 301 controls the first portion 499 of the display 320, this may mean that at least one pixel (e.g., a pixel 431) included in the first portion 499, among the plurality of pixels (e.g., the pixels 431) of the electronic device 301 is controlled. For example, the electronic device 301 may control the first portion 499 of the display 320 to display a screen on the first portion 499 of the display 320, and a state in which a screen is displayed in the first portion 499 may be referred to as an active state (or a UDC-On state). For example, the electronic device 301 may obtain an image using the camera module 330 in the active state (e.g., the UDC-On state) of the first portion 499 of the display 320. In another example, the electronic device 301 may control the first portion 499 of the display 320 so that a screen is not displayed on the first portion 499 of the display 320, and a state in which a screen is not displayed in the first portion 499 of the display 320 may be referred to as an inactive state (or a UDC-Off state). For example, the electronic device 301 may obtain an image using the camera module 330 in the inactive state (e.g., the UDC-Off state) of the first portion 499 of the display 320.

Figure 5:
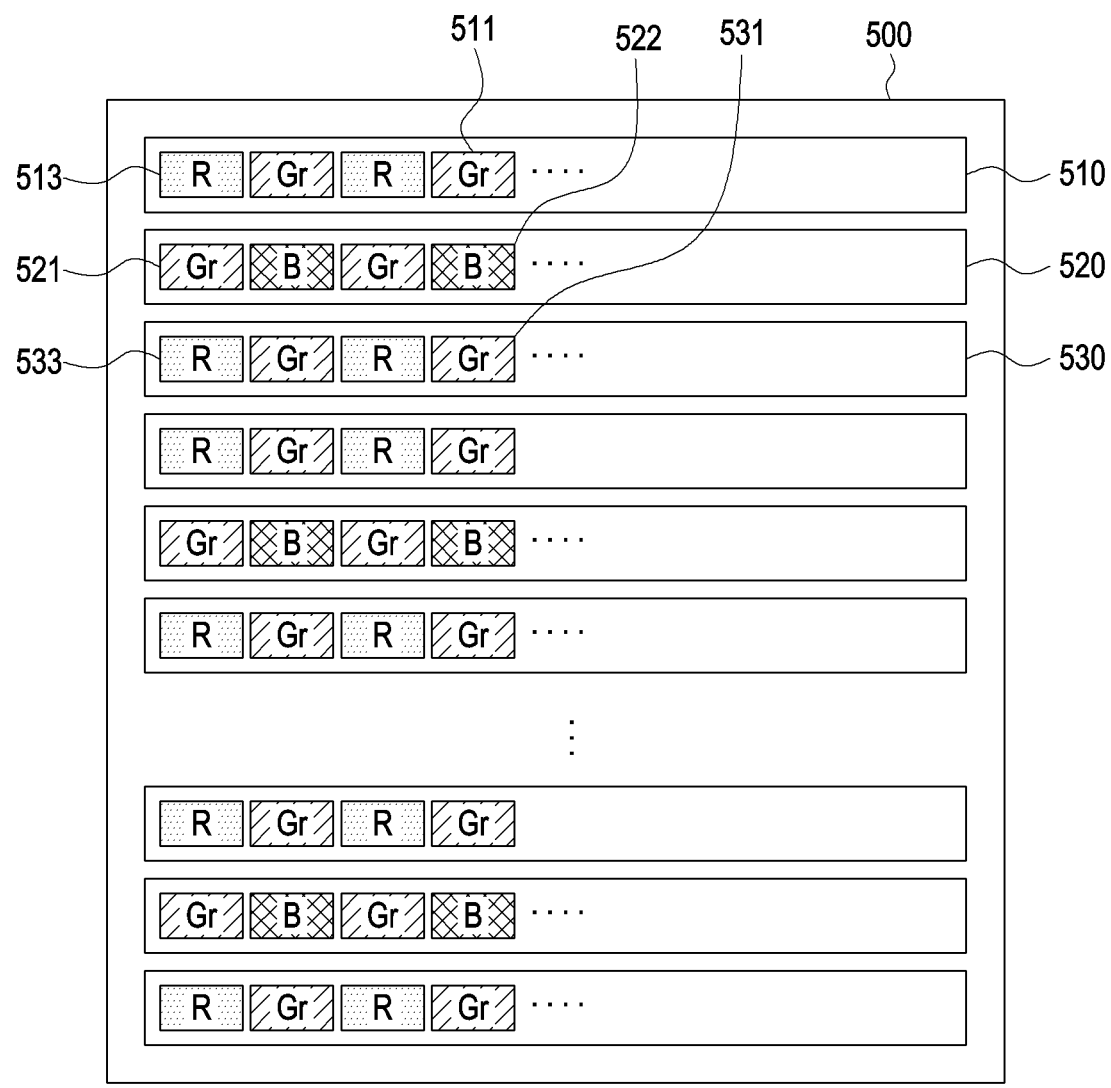
FIG. 5 is a diagram illustrating an image sensor included in a camera module according to various embodiments.

FIG. 5 is a diagram illustrating an image sensor included in a camera module according to various embodiments.

According to various embodiments, the camera module 330 (e.g., the camera module 180) of the electronic device 301 (e.g., the electronic device 101) may include an image sensor 500 (e.g., the image sensor 230).

According to various embodiments, the image sensor 500 may include a plurality of pixels. For example, the image sensor 500 may include a plurality of pixels (e.g., 511, 513, 521, 522, 531, and 533) configured in a plurality of rows (e.g., 510, 520, and 530). The number of rows (e.g., 510, 520, and 530) and the number of pixels (e.g., 511, 513, 521, 522, 531, and 533) included in the image sensor 500 are not limited. For example, the image sensor 500 may include a first row 510, a second row 520, and a third row 530. For example, the second row 520 of the image sensor 500 may be adjacent to the first row 510. For example, the third row 530 of the image sensor 500 may be adjacent to the second row 520. For example, the pixels arranged in the second row 520 of the image sensor 500 may include a pixel (e.g., 521) corresponding to a first color (e.g., green) and a pixel (e.g., 522) corresponding to a second color (e.g., blue). For example, the pixels arranged in the first row 510 of the image sensor 500 may include a pixel (e.g., 511) corresponding to the first color (e.g., green) and a pixel (e.g., 513) corresponding to a third color (e.g., red). For example, the pixels arranged in the third row 530 of the image sensor 500 may include a pixel (e.g., 531) corresponding to the first color (e.g., green) and a pixel (e.g., 533) corresponding to the third color (e.g., red). For example, the number of pixels (e.g., 522) of the second color (e.g., blue) included in the image sensor 500 may be less than the number of pixels (e.g., 511, 521, and 531) of the first color (e.g., green). For example, the number of pixels (e.g., 513 and 533) of the third color (e.g., red) included in the image sensor 500 may be less than the number of pixels (e.g., 511, 521, and 531) of the first color (e.g., green) and greater than the number of pixels (e.g., 522) of the second color (e.g., blue). For example, the pixels (e.g., 511, 521, and 531) of the first color (e.g., green) may be included respectively in the first row 510, the second row 520, and the third row 530 of the image sensor 500, the pixels (e.g., 522) of the second color (e.g., blue) may be included in the second row 520 of the image sensor 500, and the pixels (e.g., 513 and 533) of the third color (e.g., red) may be included respectively in the first row 510 and the third row 530 of the image sensor 500. For example, a first wavelength corresponding to the first color (e.g., green) of the pixels (e.g., 511, 521, and 531) included in the image sensor 500 may be longer than a second wavelength corresponding to the second color (e.g., blue) of the pixels (e.g., 522) included in the image sensor 500. For example, a third wavelength corresponding to the third color (e.g., red) of the pixels (e.g., 513 and 533) included in the image sensor 500 may be longer than the second wavelength corresponding to the second color (e.g., blue) of the pixels (e.g., 522) included in the mage sensor 500, and longer than the first wavelength corresponding to the first color (e.g., red) of the pixels (e.g., 511, 521, and 531) included in the image sensor 500. For example, the first wavelength corresponding to the first color (e.g., green) may be a wavelength in a band of 540 nm to 560 nm, the second wavelength corresponding to the second color (e.g., blue) may be a wavelength in a band of 440 nm to 460 nm, and the third wavelength corresponding to the third color (e.g., red) may be a wavelength in a band of 640 nm to 660 nm. For example, the image sensor 500 may be configured such that a pattern of the first row 510, the second row 520, and the third row 530 is repeated, which is exemplary, and the configuration of the image sensor 500 is not limited.

Figure 6:
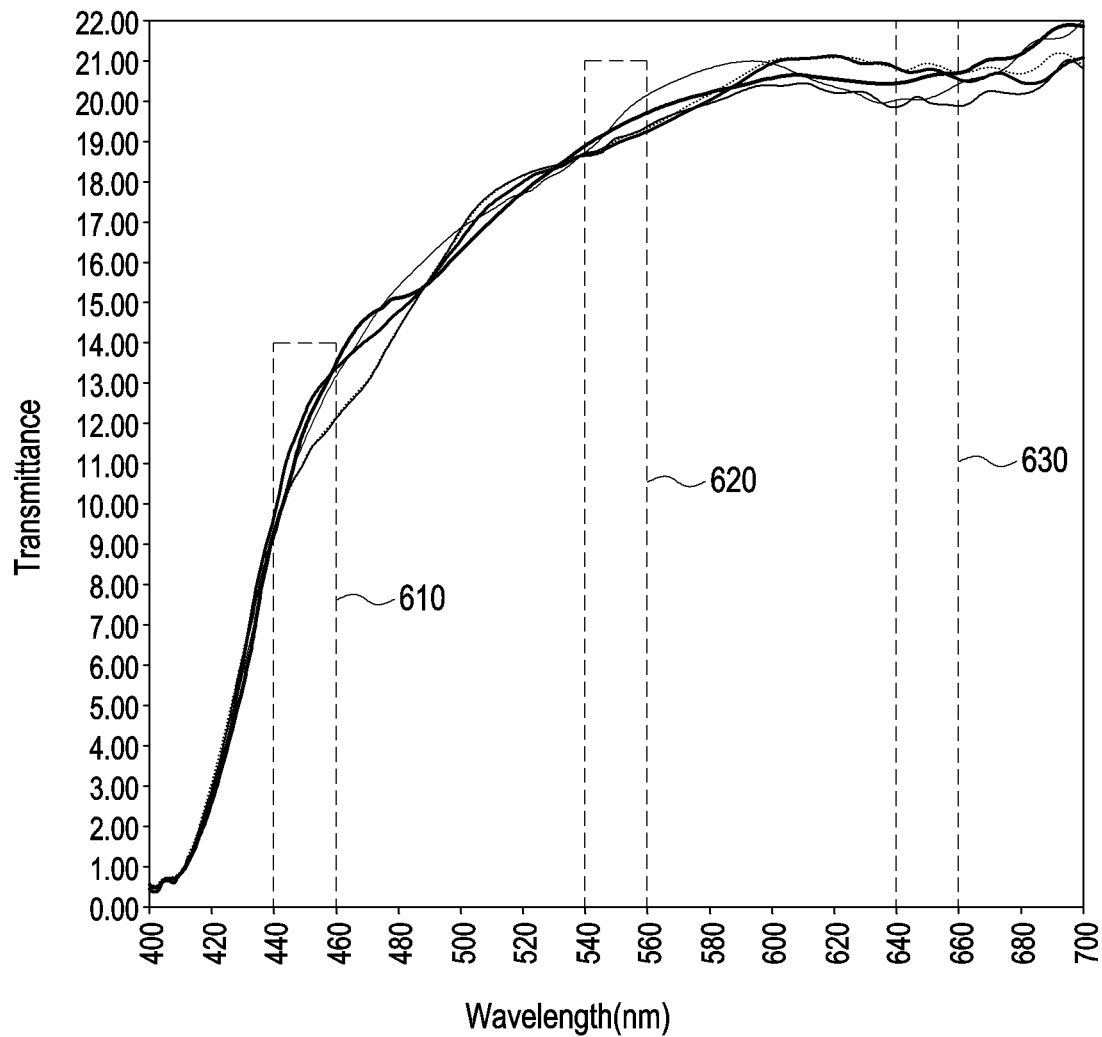
FIG. 6 is a diagram illustrating an operation of an electronic device according to various embodiments.

FIG. 6 is a diagram illustrating an operation of an electronic device according to various embodiments.

FIG. 6 is a diagram illustrating transmittances according to wavelengths in a UDC (e.g., the camera module 330 of FIG. 3).

Referring to FIG. 6, a first transmittance of the first wavelength (e.g., 540 nm to 560 nm) corresponding to the first color (e.g., green) of the image sensor 500 of FIG. 5 may be higher than a second transmittance of the second wavelength (e.g., 440 nm to 460 nm) corresponding to the second color (e.g., blue) of the image sensor 500 of FIG. 5, and lower than a third transmittance of the third wavelength (e.g., 640 nm to 660 nm) corresponding to the third color (e.g., red) of the image sensor 500 of FIG. 5.

Figure 7:
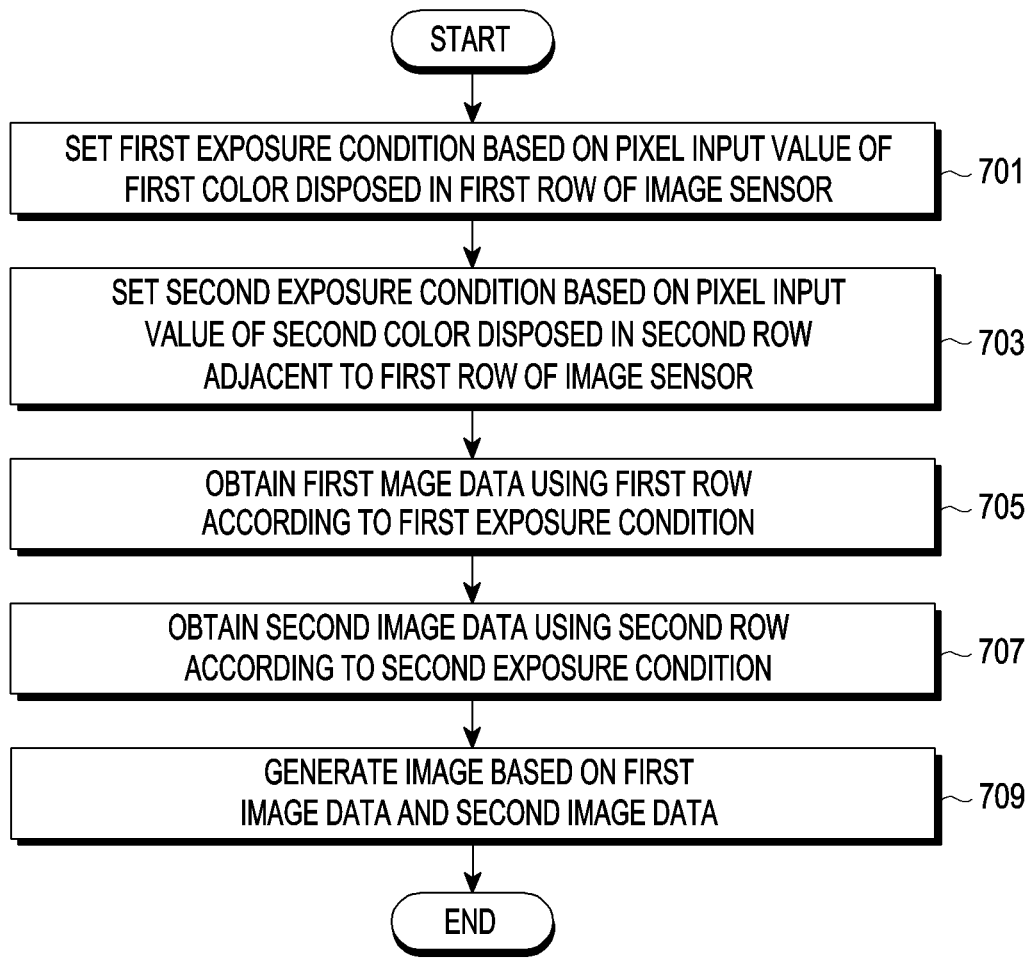
FIG. 7 is a flowchart illustrating an operation of an electronic device according to various embodiments.

FIG. 7 is a flowchart illustrating an operation of an electronic device according to various embodiments. FIG. 7 will be described with reference to FIGS. 3, 4, and 5.

Referring to FIG. 7, in operation 701, according to various embodiments, the electronic device 301 (e.g., the electronic device 101) (e.g., the processor 120 of the electronic device 101) may set a first exposure condition based on a pixel input value (e.g., an input value of the pixel 511 or an average of pixel input values of pixels representing the same color as the pixel 511) of the first color (e.g., green) arranged in the first row 510 of the image sensor 500. For example, the exposure condition may include a condition for an exposure time or a condition for an exposure interval. A method of setting an exposure condition for the image sensor 500 by the electronic device 101 will be described with reference to FIGS. 9, 10, and 11.

In operation 703, according to various embodiments, the electronic device 301 may set a second exposure condition based on a pixel input value (e.g., an input value of the pixel 522 or an average of pixel input values of pixels representing the same color as the pixel 522) of the second color (e.g., blue) arranged in the second row 520 of the image sensor 500.

In operation 705, according to various embodiments, the electronic device 301 may obtain image data (e.g., first image data) using the first row 510 of the image sensor 500 according to the first exposure condition. For example, the electronic device 301 may obtain the image data (e.g., the first image data) using the first row 510 of the image sensor 500 according to the first exposure condition that is set based on the pixel input value (e.g., the input value of the pixel 511 or the average of pixel input values of the pixels representing the same color as the pixel 511) of the first color (e.g., green) arranged in the first row 510 of the image sensor 500. For example, the electronic device 301 may obtain image data, using the third row 530 of the image sensor 500 according to the first exposure condition. For example, when a plurality of rows of the image sensor 500 are configured such that the pattern including the first row 510, the second row 520, and the third row 530 is repeated, the electronic device 101 may obtain a plurality of image data (e.g., a plurality of first image data), using a plurality of rows corresponding to the first row 510 and the third row 530 according to the first exposure condition.

In operation 707, according to various embodiments, the electronic device 301 may obtain image data (e.g., second image data) using the second row 520 of the image sensor 500 according to the second exposure condition. For example, the electronic device 301 may obtain the image data (e.g., the second image data) using the second row 510 of the image sensor 500 according to the second exposure condition that is set based on the pixel input value (e.g., the input value of the pixel 522 or the average of the pixel input values of the pixels representing the same color as the pixel 522) of the second color (e.g., blue) arranged in the second row 520 of the image sensor 500. For example, when a plurality of rows of the image sensor 500 are configured such that the pattern including the first row 510, the second row 520, and the third row 530 is repeated, the electronic device 101 may obtain a plurality of image data (e.g., a plurality of second image data), using a plurality of rows corresponding to the second row 520 according to the second exposure condition.

In operation 709, according to various embodiments, the electronic device 301 may generate an image based on the first image data obtained in operation 705 and the second image data obtained in operation 707.

Figure 8:
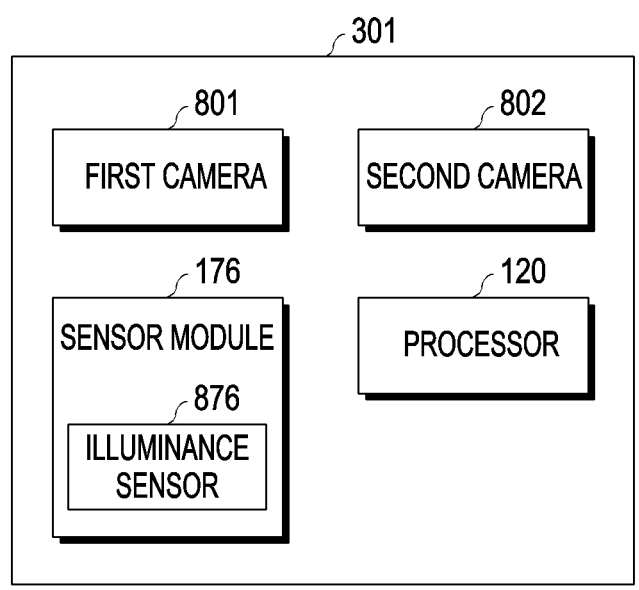
FIG. 8 is a block diagram illustrating an electronic device according to various embodiments.

FIG. 8 is a block diagram illustrating an electronic device according to various embodiments.

According to various embodiments, referring to FIG. 8, the electronic device 301 (e.g., the electronic device 101) may include the processor 120, a first camera 801 (e.g., a first camera module), a second camera 802 (e.g., a second camera module), and the sensor module 176. For example, the sensor module 176 may include an illuminance sensor 876. For example, the electronic device 301 (e.g., the electronic device 101) (e.g., the processor 120) may sense ambient environmental information about the electronic device 301 using the illuminance sensor 876.

According to various embodiments, while the first camera 801 may be a camera disposed on the front surface of the electronic device 101, the position of the first camera 801 is not limited. For example, the first camera 801 may be the camera module 330 of FIG. 3. For example, the first camera 801 may be a UDC. For example, the first camera 801 may be disposed under the display module 160 (e.g., the display 320) and include a first image sensor (e.g., the image sensor 500 of FIG. 5).

According to various embodiments, while the second camera 802 may be a camera disposed on the rear surface of the electronic device 101, the position of the second camera 802 is not limited. For example, a description of the camera module 180 may be understood as a description of the second camera 802. For example, the second camera 802 may be a different camera from the first camera 801. For example, the second camera 802 may include a second image sensor. For example, the second image sensor of the second camera 802 may be the same type of image sensor as the image sensor 500 of FIG. 5 or a different image sensor from the image sensor 500 of FIG. 5.

Figure 9:
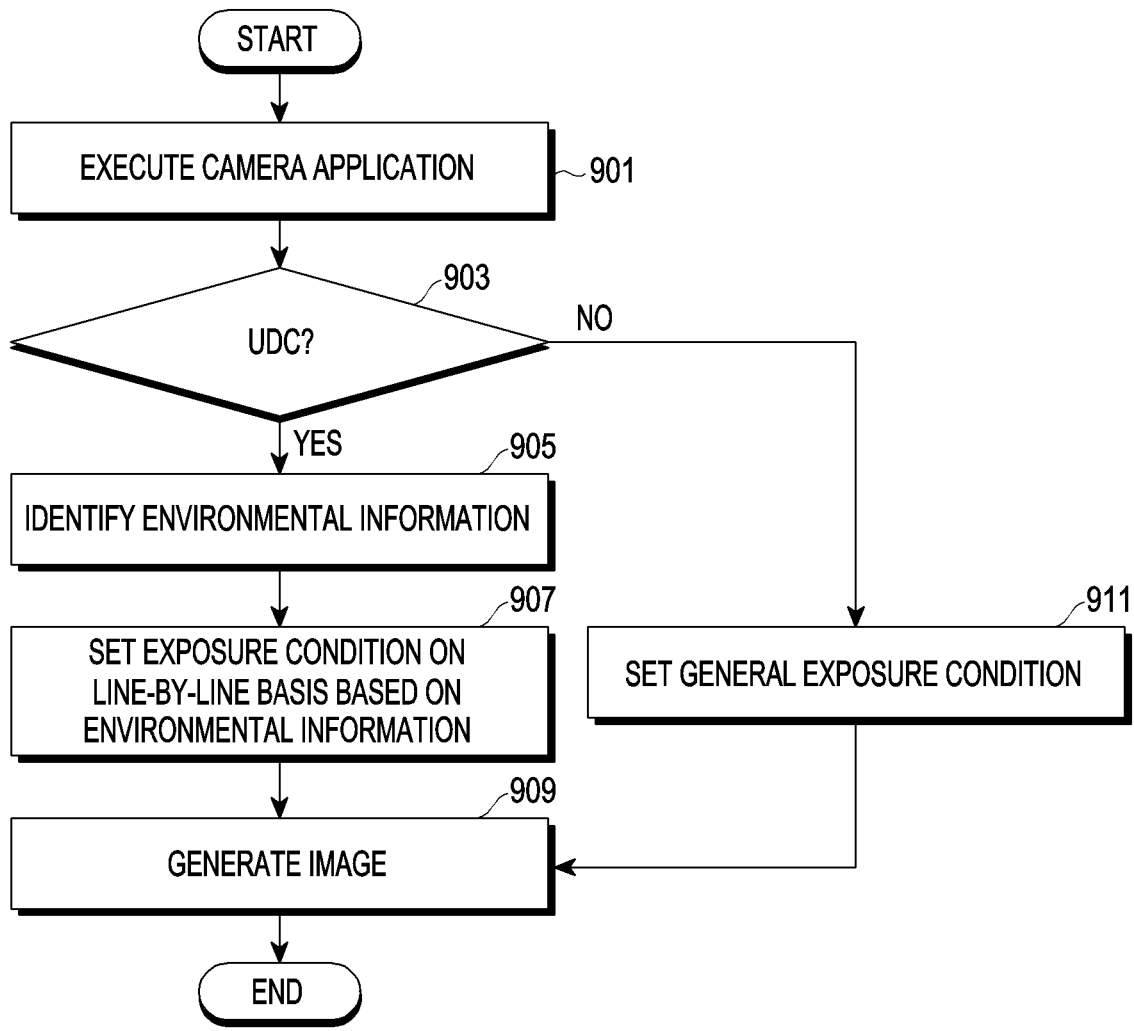
FIG. 9 is a flowchart illustrating an operation of an electronic device according to various embodiments.

FIG. 9 is a flowchart illustrating an operation of an electronic device according to various embodiments. FIG. 9 will be described with reference to FIGS. 3, 4, 5, and 8.

Referring to FIG. 9, in operation 901, according to various embodiments, the electronic device 301 (e.g., the electronic device 101) (e.g., the processor 120 of the electronic device 101) may execute a camera application. For example, the electronic device 301 may execute the camera application based on a user input, and there is no limitation on conditions and methods for executing the camera application.

In operation 903, according to various embodiments, the electronic device 301 may determine whether a camera module used for an operation performed through the camera application is a UDC. For example, referring to FIG. 8, the electronic device 101 may determine whether the camera module used for the operation performed through the camera application is the first camera 801 (e.g., the first camera module) or the second camera 802 (e.g., the second camera module). According to various embodiments, the electronic device 301 may perform operation 905 and/or operation 907 based on the camera module used for the operation performed through the camera application being a UDC (e.g., the first camera 801). While operations 905 and 907 are shown as performed after operation 903 in FIG. 9, this is exemplary and operation 905 may be performed before operation 903.

In operation 905, according to various embodiments, the electronic device 301 may identify ambient environmental information about the electronic device 301. For example, the environmental information may include illuminance information and/or color temperature information around the electronic device 301. For example, the environmental information may include automatic exposure (AE) information, auto white balance (AWB) information, automatic focus (AF) information, and/or sensing information of the illuminance sensor 876. The environmental information will be described with reference to FIGS. 10 and 11.

In operation 907, according to various embodiments, the electronic device 301 may set an exposure condition for each line of the first image sensor (e.g., the image sensor 500) of the first camera 801 (e.g., the camera module 330) based on the ambient environmental information about the electronic device 301. Each line of the image sensor 500 may mean each of a plurality of rows including the first row 510, the second row 520, and the third row 530 of FIG. 5. For example, based on the camera module used for the operation performed through the camera application being the first camera 801 (e.g., the first camera module) which is a UDC, the electronic device 301 may set an exposure condition for each line of the first image sensor (e.g., the image sensor 500) of the camera 801 (e.g., the camera module 330). For an embodiment of setting an exposure condition for each line of the first image sensor (e.g., the image sensor 500) of the first camera 801 (e.g., the camera module 330), the description of operations 701 and 703 of FIG. 7 may be referred to. An embodiment of setting an exposure condition based on ambient environmental information by the electronic device 301 will be described later with reference to FIGS. 10 and 11.

In operation 911, according to various embodiments, the electronic device 301 may set a general exposure condition, based on the camera module used for the operation performed through the camera application being a camera (e.g., the second camera 802) other than the UDC (e.g., the first camera 801). For example, the general exposure condition may be an exposure condition specified for an image sensor of a camera (e.g., the second camera 802) other than the UDC (e.g., the first camera 801), and a setting value of the general exposure condition is not limited. For example, based on the camera module used for the operation performed through the camera application being the second camera 802 (e.g., the second camera module), the electronic device 301 may set an exposure condition (e.g., the general exposure condition) based on a pixel value of the same color as the first color (e.g., green) of the image sensor 500 of FIG.

5 in the second image sensor of the second camera 802 (e.g., the same type of image sensor as or a different image sensor from the image sensor 500 of FIG. 5). For example, when the image sensor (e.g., the second image sensor) of the second camera 802 is implemented in the same type as the image sensor 500 of FIG. 5, the electronic device 101 may set the general exposure condition as the exposure conditions of the plurality of rows (the rows corresponding to 510, 520, and 530 in FIG. 5) included in the image sensor (e.g., the second image sensor) of the second camera 802, based on the camera module used for the operation performed through the camera application being the second camera 802 (e.g., the second camera module).

In operation 909, according to various embodiments, the electronic device 301 may generate an image according to the exposure condition set in operation 907 or 911. For example, when an exposure condition is set in operation 907, an embodiment in which an image (e.g., a first image) is generated in operation 909 may be understood from the description of operations 705, 707, and 709 of FIG. 7. For example, when an exposure condition is set in operation 911, the electronic device 301 may generate an image (e.g., a second image) using the image sensor (e.g., the second image sensor) of the second camera 802 according to the general exposure condition set in operation 911.

Figure 10:
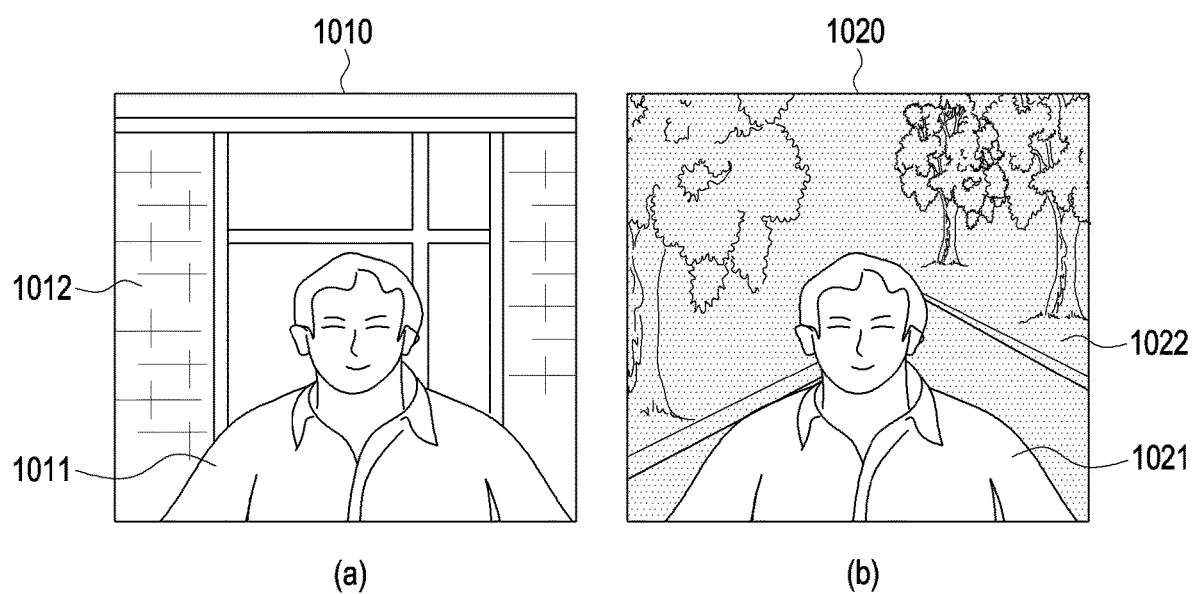
FIG. 10 is a diagram illustrating an operation of an electronic device according to various embodiments.

FIG. 10 is a diagram illustrating an operation of an electronic device according to various embodiments.

FIG. 10 is a diagram illustrating an ambient environment of the electronic device 301 according to various embodiments.

For example, (a) of FIG. 10 illustrates an image 1010 of a subject 1011 and a background 1012, generated using the electronic device 301. In (a) of FIG. 10, an ambient environment (e.g., the background 1012) of the electronic device 301 may be a low color temperature environment. For example, the background 1012 may have a color of a long wavelength (e.g., a wavelength area representing red and a color adjacent to red).

For example, (b) of FIG. 10 illustrates an image 1020 of a subject 1021 and a background 1022, generated using the electronic device 301. In (b) of FIG. 10, an ambient environment (e.g., the background 1022) of the electronic device 301 may be a low-illuminance environment. For example, the image 1020 of (b) of FIG. 10 may be an image captured in a dark environment around the electronic device 301 (e.g., at night).

Figure 11:
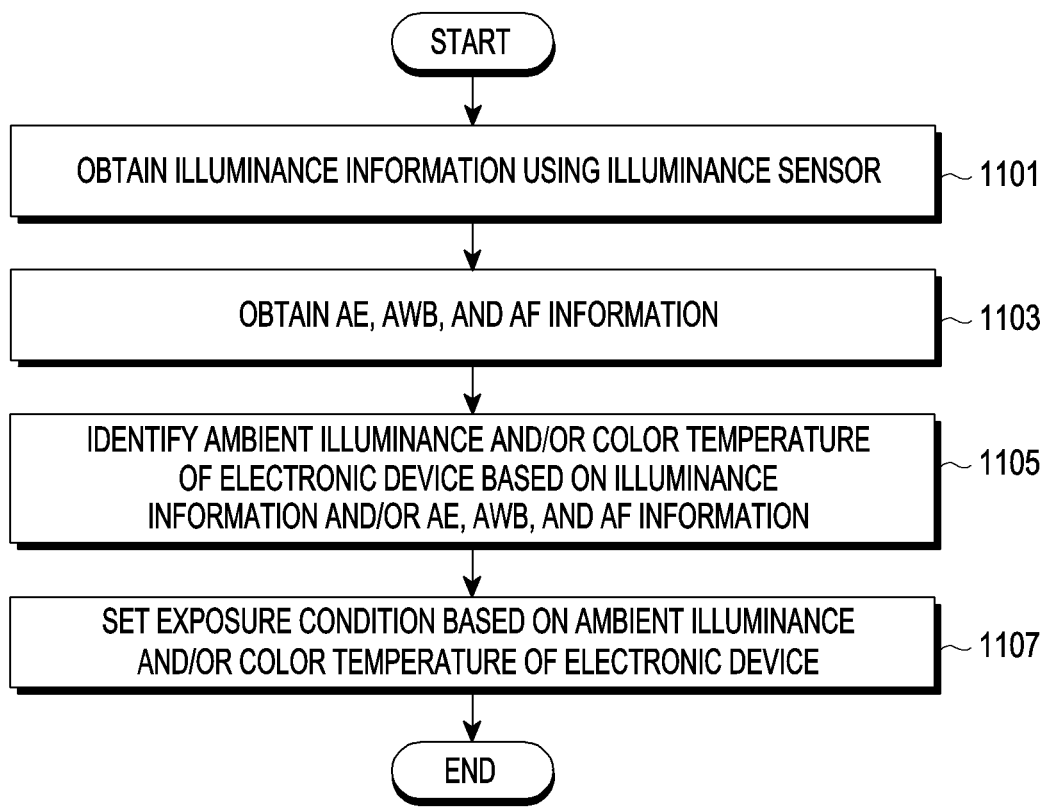
FIG. 11 is a flowchart illustrating an operation of an electronic device according to various embodiments.

FIG. 11 is a flowchart illustrating an operation of an electronic device according to various embodiments. FIG. 11 will be described with reference to FIGS. 3, 4, 5, 8, and 10.

While operation 1101, operation 1103, operation 1105, and operation 1107 are shown as performed in order in FIG. 11, this is exemplary. The order of operation 1101 and operation 1103 is not limited, and one of operation 1101 and operation 1103 may be omitted according to an implementation example.

Referring to FIG. 11, in operation 1101, according to various embodiments, the electronic device 301 (e.g., the electronic device 101) (e.g., the processor 120 of the electronic device 101) may obtain ambient environmental information (e.g., illuminance information and/or color temperature information) about the electronic device 301, using the illuminance sensor 876. There is no limitation on how and when the electronic device 301 obtains the ambient environmental information (e.g., the illuminance information and/or the color temperature information) about the electronic device 301 using the illuminance sensor 876.

In operation 1103, according to various embodiments, the electronic device 301 may obtain information about AE, AWB, and AF. For example, the electronic device 301 may obtain the ambient environmental information about the electronic device 301 (e.g., the illuminance information and/or the color temperature information) based on the information about the AE, AWB, and AF of the electronic device 301. There is no limitation on how and when the electronic device 301 obtains the ambient environmental information (e.g., the illuminance information and/or the color temperature information) about the electronic device 301 based on the information about the AE, AWB, and AF of the electronic device 301.

In operation 1105, according to various embodiments, the electronic device 301 may identify the ambient illuminance and/or color temperature of the electronic device 301 based on at least one of the information obtained in operation 1101 or the information obtained in operation 1103.

In operation 1107, according to various embodiments, the electronic device 301 may set an exposure condition of an image sensor (e.g., the image sensor 500) of a camera module (e.g., the camera module 330) (e.g., the first camera 801) based on the ambient illuminance and/or color temperature of the electronic device. For example, the electronic device 301 may set the exposure condition of the image sensor (e.g., the image sensor 500) of the camera module (e.g., the camera module 330) (e.g., the first camera 801) based on whether the surroundings of the electronic device 301 have a low illuminance and/or a low color temperature. For example, the electronic device 301 may set different exposure conditions for a first illuminance and a second illuminance as the ambient illuminance of the electronic device 301. For example, the electronic device 301 may set an exposure condition for a line having the second color (e.g., blue) (e.g., the second row 520 of FIG. 5) in the image sensor 500, based on the ambient environmental information (e.g., the illuminance information and/or the color temperature information) about the electronic device 301.

Those skilled in the art will understand that the various embodiments described herein may be organically applied to each other within an applicable range. For example, those skilled in the art will understand that at least some operations of one embodiment described herein may be omitted, and that at least some operations of one embodiment and at least some operations of another embodiment may be applied organically in conjunction with each other.

According to various embodiments, the electronic device 301 may include: the display 320 (e.g., the display module 160), the first camera module 801 (e.g., the camera module 330) disposed under the display (e.g., the display module 160) and including the first image sensor 500; and the processor 120. The processor 120 may be configured to obtain first image data using the first row 510 of the first image sensor 500 according to a first exposure condition set based on a pixel input value of a first color disposed in the first row 510, obtain second image data using the second row 520 adjacent to the first row of the first image sensor according to a second exposure condition set based on an pixel input value of a second color disposed in the second row 520, and generate a first image based on the first image data and the second image data.

According to various embodiments, a number of pixels of the second color included in the first image sensor 500 may be less than a number of pixels of the first color.

According to various embodiments, the second row 510 of the first image sensor 500 may include at least one pixel (e.g., 521) of the first color.

According to various embodiments, the electronic device 301 may further include the illuminance sensor 876, and the processor 120 may be configured to set the second exposure condition based on illuminance information obtained using the illuminance sensor 876.

According to various embodiments, the processor 120 may be configured to set the second exposure condition based on AE information, AWB information, and AF information.

According to various embodiments, the processor 120 may be configured to identify an ambient illuminance and/or an ambient color temperature of the electronic device 301 based on ambient environmental information about the electronic device 301 and set the second exposure condition based on the illuminance and/or the color temperature.

According to various embodiments, the processor 120 may be configured to execute a camera application, and set the second exposure condition based on the pixel input value of the second color disposed in the second row 520 based on a camera module used for an operation performed through the camera application being the first camera module 801 (e.g., the camera module 330).

According to various embodiments, the electronic device may further include the second camera module 802, and the processor 120 may be configured to set a third exposure condition of a second image sensor (e.g., an image sensor of the same type as the image sensor 500 or an image sensor different from the image sensor 500) of the second camera module 802 based on the camera module used for the operation performed through the camera application being the second camera module 802, obtain third image data using the second image sensor (e.g., an image sensor of the same type as the image sensor 500 or an image sensor different from the image sensor 500) according to the third exposure condition, and generate a second image based on the third image data.

According to various embodiments, the third exposure condition of the second image sensor (e.g., an image sensor of the same type as the image sensor 500 or an image sensor different from the image sensor 500) may be set based on a pixel input value of the same color as the first color (e.g., a color corresponding to the pixel 511) (e.g., green) in the second image sensor (e.g., an image sensor of the same type as the image sensor 500 or an image sensor different from the image sensor 500).

According to various embodiments, a wavelength of the first color (e.g., the color corresponding to the pixel 511) (e.g., green) may be longer than a wavelength of the second color (e.g., a color corresponding to the pixel 522) (e.g., blue).

According to various embodiments, the electronic device 301 includes a first camera module 801 (e.g., the camera module 330) and a display 320 (e.g., the display module 160) and a method of operating the electronic device 301 may include obtaining first image data using the first row 510 of the first image sensor 500 included in the first camera module 801 according to a first exposure condition set based on a pixel input value of a first color disposed in the first row 510, obtaining second image data using the second row 520 adjacent to the first row 510 of the first image sensor 500 according to a second exposure condition set based on an pixel input value of a second color disposed in the second row 520, and generating a first image based on the first image data and the second image data. The first camera module 801 (e.g., the camera module 330) may be disposed under the display 320 (e.g., the display module 160) of the electronic device 301.

According to various embodiments, a number of pixels of the second color included in the first image sensor 500 may be less than a number of pixels of the first color.

According to various embodiments, the second row 510 of the first image sensor 500 may include at least one pixel of the first color.

According to various embodiments, the method may further include setting the second exposure condition based on illuminance information obtained using the illuminance sensor 876 of the electronic device 301.

According to various embodiments, the method may further include setting the second exposure condition based on AE information, AWB information, and AF information.

According to various embodiments, the method may further include identifying an ambient illuminance and/or an ambient color temperature of the electronic device 301 based on ambient environmental information about the electronic device 301 and setting the second exposure condition based on the illuminance and/or the color temperature.

According to various embodiments, the method may further include executing a camera application, and setting the second exposure condition based on the pixel input value of the second color disposed in the second row 520 based on a camera module used for an operation performed through the camera application being the first camera module 801 (e.g., the camera module 330).

According to various embodiments, the method may further include setting a third exposure condition of a second image sensor (e.g., an image sensor of the same type as the image sensor 500 or an image sensor different from the image sensor 500) of the second camera module 802 based on the camera module used for the operation performed through the camera application being the second camera module 802, obtaining third image data using the second image sensor (e.g., an image sensor of the same type as the image sensor 500 or an image sensor different from the image sensor 500) according to the third exposure condition, and generating a second image based on the third image data.

According to various embodiments, the third exposure condition of the second image sensor (e.g., an image sensor of the same type as the image sensor 500 or an image sensor different from the image sensor 500) may be set based on a pixel input value of the same color as the first color (e.g., a color corresponding to the pixel 511) (e.g., green) in the second image sensor (e.g., an image sensor of the same type as the image sensor 500 or an image sensor different from the image sensor 500).

According to various embodiments, a wavelength of the first color (e.g., the color corresponding to the pixel 511) (e.g., green) may be longer than a wavelength of the second color (e.g., a color corresponding to the pixel 522) (e.g., blue).

According to various embodiments, a method of operating an electronic device 301 including a camera 330; 801; 802 may include executing a camera application, determining whether the camera 330; 801; 802 is an under display camera (UDC) 330; 801, setting a general exposure condition for the camera application in an event the camera 330; 801; 802 is not a under display camera 330; 801 and subsequently generating an image and identifying ambient environmental information and setting an exposure condition on a line-by-line basis based on the ambient environmental information and subsequently generating the image.

According to various embodiments, the ambient environmental information includes illuminance information and/or color temperature information around the electronic device 301 and the exposure condition is set for each line of a first image sensor 500 of the camera 330; 801.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element. As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a display;
   an illuminance sensor;
   a first camera module disposed under the display and including a first image sensor, the first image sensor comprising a first row and a second row adjacent to the first row; and
   a processor configured to:
   obtain first image data using the first row according to a first exposure condition set based on a pixel input value of a first color disposed in the first row,
   set a second exposure condition based on illuminance information obtained using the illuminance sensor,
   obtain second image data using the second row according to the second exposure condition set based on an pixel input value of a second color disposed in the second row, and
   generate a first image based on the first image data and the second image data,
   wherein a number of pixels of the second color included in the first image sensor is less than a number of pixels of the first color, and
   wherein the second row includes at least one pixel of the first color.

2. The electronic device of claim 1, wherein the processor is configured to set the second exposure condition based on at least one or more of auto exposure (AE) information, auto white balance (AWB) information and auto focus (AF) information.

3. The electronic device of claim 1, wherein the processor is configured to:
identify an ambient illuminance and/or an ambient color temperature of the electronic device based on ambient environmental information about the electronic device, and
set the second exposure condition based on the illuminance and/or the color temperature.

4. The electronic device of claim 1, wherein the processor is configured to:
execute a camera application, and
set the second exposure condition based on the pixel input value of the second color disposed in the second row based on a camera module used for an operation performed through the camera application being the first camera module.

5. The electronic device of claim 4, further comprising a second camera module,
wherein the processor is configured to:
set a third exposure condition of a second image sensor of the second camera module based on the camera module used for the operation performed through the camera application being the second camera module,
obtain third image data using the second image sensor according to the third exposure condition, and
generate a second image based on the third image data,
wherein the third exposure condition of the second image sensor is set based on a pixel input value of the same color as the first color in the second image sensor.

6. The electronic device of claim 1, wherein a wavelength of the first color is longer than a wavelength of the second color.

7. A method of operating an electronic device comprising a first camera module, an illuminance sensor, and a display, the method comprising:
disposing the first camera module under the display;
obtaining first image data using a first row of a first image sensor included in the first camera module according to a first exposure condition set based on a pixel input value of a first color disposed in the first row;
setting a second exposure condition based on illuminance information obtained using the illuminance sensor,
obtaining second image data using the second row adjacent to the first row of the first image sensor according to the second exposure condition set based on an pixel input value of a second color disposed in the second row; and
generating a first image based on the first image data and the second image data,
wherein a number of pixels of the second color included in the first image sensor is less than a number of pixels of the first color, and
wherein the second row of the first image sensor includes at least one pixel of the first color.

8. The method of claim 7, further comprising setting the second exposure condition based on at least one of auto exposure (AE) information, auto white balance (AWB) information and auto focus (AF) information.

9. The method of claim 7, further comprising:
identifying an ambient illuminance and/or an ambient color temperature of the electronic device based on ambient environmental information about the electronic device, and
setting the second exposure condition based on the illuminance and/or the color temperature.

10. The method of claim 7, further comprising:
executing a camera application, and
setting the second exposure condition based on the pixel input value of the second color disposed in the second row based on a camera module used for an operation performed through the camera application being the first camera module.

11. The method of claim 10, further comprising:
setting a third exposure condition of a second image sensor of the second camera module based on the camera module used for the operation performed through the camera application being a second camera module,
obtaining third image data using the second image sensor according to the third exposure condition, and
generating a second image based on the third image data,
wherein the third exposure condition of the second image sensor is set based on a pixel input value of the same color as the first color in the second image sensor.

12. The method of claim 7, wherein a wavelength of the first color is longer than a wavelength of the second color.

* * * * *